United States Patent [19]
Pecceu

[11] Patent Number: 6,044,728
[45] Date of Patent: Apr. 4, 2000

[54] POWER SHIFT TRANSMISSION FOR A MOVABLE MACHINE AND METHOD FOR CONTROLLING A POWER SHIFT TRANSMISSION FOR A MOVABLE MACHINE

[75] Inventor: Hendrik Pecceu, Oostnieuwkerke, Belgium

[73] Assignee: Clark Equipment, Bruges, Belgium

[21] Appl. No.: 09/132,238

[22] Filed: Aug. 11, 1998

[30] Foreign Application Priority Data

Aug. 12, 1997 [DE] Germany ........................... 197 34 825

[51] Int. Cl.[7] .................................................. F16H 47/07
[52] U.S. Cl. .......................................... 74/730.1; 74/733.1
[58] Field of Search .................................. 74/718, 730.1, 74/732.1, 733.1; 475/73, 78, 218

[56] References Cited

U.S. PATENT DOCUMENTS

| | | | |
|---|---|---|---|
| 2,939,342 | 6/1960 | Woydt et al. | 475/78 |
| 3,213,712 | 10/1965 | Swift | 74/730.1 |
| 3,782,225 | 1/1974 | Grabow | 74/733.1 X |
| 4,354,400 | 10/1982 | Baker | 475/74 |
| 5,492,034 | 2/1996 | Bogema | 74/730.1 |

OTHER PUBLICATIONS

"Favorit 926" issue E Nov. 10, 1995, by Xaver Fendt GmbH & Co.

*Primary Examiner*—Sherry L. Estremsky
*Attorney, Agent, or Firm*—Liniak, Berenato, Longacre & White

[57] ABSTRACT

A power shift transmission (10) for a movable machine comprises an input shaft (9) driven by an engine (1), an output shaft (8), at least one mechanical drive line (13) and at least two separate hydrostatic drive lines (4, 5). Each of the hydrostatic drive lines (4, 5) comprises a separate shaft (32, 43) and is designed to be coupled to the output shaft (8) via synchronizing devices (34, 35, 45, 46, 47) and gear units. The at least two hydrostatic drive lines (4, 5) are arranged in parallel. At least one power shift clutch (15) is arranged at the input end of each of the at least one mechanical driving (13) line and at least one power shift clutch (40, 42) is arranged at the input end of each of the at least two hydrostatic drive lines (4, 5).

14 Claims, 4 Drawing Sheets

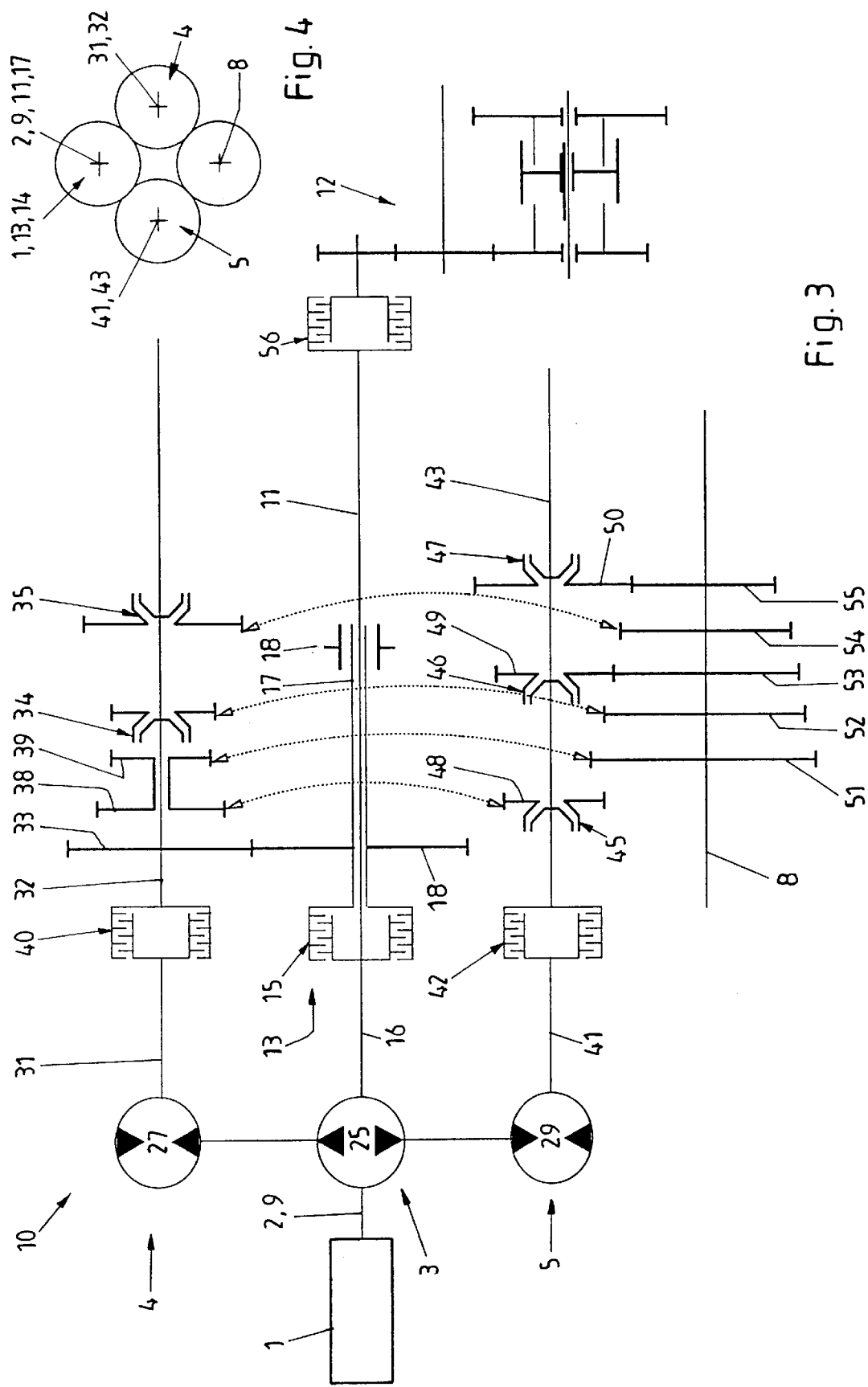

| Range | 4 | 5 | 40 | 42 | 15 | 19 | 45 | 34 | 46 | 35 | 47 |
|---|---|---|---|---|---|---|---|---|---|---|---|
| 1 | X | X | X | X | | | X | X | | | |
| 2 | | X | | X | | | X | | | | |
| 3 | | | | | | X | X | | | | |
| 4 | X | | X | | | X | X | X | | | |
| 5 | X | | X | | | | X | | | | |
| 6 | | | | | X | | X | | | | |
| 7 | | X | | X | X | | X | | X | | |
| 8 | | X | | X | | | | | X | | |
| 9 | | | | | | X | | | X | | |
| 10 | X | | X | | | X | | X | X | | |
| 11 | X | | X | | | | | | X | | |
| 12 | | | | | X | | | | X | | |
| 13 | | X | | X | X | | | | | X | X |
| 14 | | X | | X | | | | | | | X |
| 15 | | | | | | X | | | | | X |

6,044,728

POWER SHIFT TRANSMISSION FOR A MOVABLE MACHINE AND METHOD FOR CONTROLLING A POWER SHIFT TRANSMISSION FOR A MOVABLE MACHINE

CROSS REFERENCE TO RELATED APPLICATIONS

This application claims the benefit of co-pending German patent application serial number 197 34 825.4 entitled "Lastschaltgetriebe für eine fahrbare Arbeitsmaschine", filed on Aug. 12, 1997.

FIELD OF THE INVENTION

The invention generally relates to a power shift transmission for a movable machine or a vehicle. More particularly, the invention relates to a power shift transmission for agricultural and constitution machines and vehicles. Further, the invention relates to method for controlling a power shift transmission for a movable machine or vehicle.

BACKGROUND OF THE INVENTION

A power shift transmission is known from the prospectus "Favorit 926" issue E 11/95/10 by the firm "Xaver Fendt GmbH & Co.". The power shift transmission is controllable by a clutch arranged at the input shaft. The clutch is followed by a planet gear that makes it possible to split the power. A hydrostatic drive line and a mechanical drive line are arranged in parallel to each other and following to the planet gear. The parts of the power transmitted by the two drive lines are brought together to a summating output line. An axial piston pump having an adjustable turning angle is provided within the hydrostatic drive line. Two axial piston motors can be controlled by the axial piston pump to attain a great multiplication. The turning angles of the axial piston motors can be only adjusted in common. The axial piston motors work on the one common summating output shaft. A shaft arranged following to the output shaft can be connected to the output shaft by a clutch and via alternatively one of two gear units. In case of low numbers of revolutions of the output shaft and correspondingly low driving speeds, the power is split by means of the planet gear. Approximately 75% of the power is transmitted via the hydrostatic drive line and approximately 25% of the power is transmitted via the mechanical drive line. Consequently, the relatively low operational efficiency within the hydrostatic drive line has a disadvantageous effect. The driving speed always depends on the number of revolutions of the engine since a direct connection via the mechanical drive line is given. In case of great numbers of revolutions and correspondingly great driving speeds, the axial piston motors are changed to a turning angle 0 and therefore block the axial piston pump. Consequently, high pressures and a great power dissipation occur within the hydrostatic drive line. The axial piston motors are driven by the output shaft. This results in additional power dissipation. The great operating efficiency of the mechanical drive line is used during high driving speeds but dissipation occurs always within the hydrostatic drive line.

SUMMARY OF THE INVENTION

Briefly described, the present invention provides a power shift transmission having an input shaft driven by an engine, an output shaft, at least one mechanical drive line and at least two separate hydrostatic drive lines. The at least two separate hydrostatic drive lines each include a separate shaft and are designed to be coupled to the output shaft via synchronizing devices and gear units. The at least two hydrostatic drive lines are arranged in parallel. At least one power shift clutch is arranged at the input end of each of the at least one mechanical drive line and at least one power shift clutch is arranged at the input end of each of the at least two hydrostatic drive lines.

The invention is based on the idea to always arrange at least two hydrostatic drive lines in parallel to one or more mechanical drive lines. Each mechanical drive line and each hydrostatic drive line includes a power shift clutch at the input end. Thereby, it is possible to activate or to deactivate the respective line at each moment during use. Usually, the two hydrostatic drive lines each comprise several synchronizing devices. At least one gear unit is allocated to each synchronizing device. The term "clutch" herein designates a power shift clutch. The term "synchronizing device" designates a "clutch" which can be only switched when the "clutch" is power-free. Usually, such a synchronizing device is realized by synchronizing rings that can be brought to substantially the same numbers of revolutions power-free. Since two hydrostatic drive lines are provided, it is always possible to transmit torque to the output shaft via one of the two hydrostatic drive lines when the clutch is engaged via the synchronizing device and the following gear units. At the same time, the clutch of the other hydrostatic drive line is disengaged, so that its synchronizing devices are power-free and therefore can be activated in advance. Also, the one or several mechanical drive lines include a power shift clutch arranged at the input end of the drive line, so that this mechanical drive line also can be activated and deactivated at all times, which means to transmit the torque via the mechanical drive line referred to. Each mechanical drive line may be used together with a hydrostatic drive line—at least for a limited period of time—as it is necessary to change the driving and/or working speed of the machine. When the new driving speed and working speed, respectively, is attained, the torque is transmitted advantageously via the mechanical drive line and a synchronizing device within one of the two hydrostatic drive lines, the clutch of which is disengaged. Thus, elements within the hydrostatic drive line are also used to transmit torque via the concerned mechanical drive line. It is understood that the advantageously great efficiency of the mechanical drive line is used within this range. The number of revolutions determining the driving and/or working speed of the movable machine depends on the number of revolutions of the engine.

The novel power shift transmission includes a very low number of components, as gears, shafts, clutches, synchronizing devices and the like. At all speeds it is possible to exclusively use the mechanical drive line. During switching in intermediate ranges no interruption of the pulling force occurs. When a mechanical drive line is exclusively used to transmit the torque, the power dissipation is especially low since the hydrostatic drive lines are inactive, i.e. not only the concerned clutches are disengaged but also the concerned hydraulic motors are not driven.

When two alternatively working mechanical drive lines are provided, each of the mechanical drive lines being arranged in parallel to the at least two hydrostatic drive lines and having a power shift clutch arranged at their input end, it is possible, during changing the driving level, to use the two mechanical drive lines each in combination with different synchronizing devices of the hydrostatic drive lines and with the following gear units, so that broad ranges of the driving and working spectrum can be used by mechanical transmission of torque. Especially, each mechanical drive line may be connectable to the output shaft each via at least one synchronizing device of a hydrostatic drive line and the gear unit. This means that the concerned synchronizing devices are synchronized before the clutch of the respective mechanical drive line is activated and that they do not have to be activated.

The spectrum of the driving and working speed can be broadened by each hydrostatic driving gear being connectable to the output shaft via several synchronizing devices and gear units. Depending on the combination of the concerned mechanical drive line and the concerned synchronizing device, an advantageously usable range having a great efficiency results depending on the number of revolutions of the engine.

Each mechanical drive line comprises only one gear forming a gear unit with a gear mechanically connected to a shaft of the corresponding hydrostatic drive line. This is advantageous since in this manner it is possible to arrange two mechanical components having approximately the same length in line. The overall length of the two components is approximately the same as the length of a hydrostatic drive line. Since the output shaft is arranged out of line, it is possible to arrange a power takeoff shaft drive extending through the mechanical drive or drives, i.e. to arrange a power takeoff shaft drive coaxial to the mechanical drives. The axial offset of the output shaft is necessary due to the arrangement of the gear units. The shaft of the engine may be arranged coaxial to the shafts of the mechanical drives and to the power takeoff shaft drive. From the offset of the hydrostatic drives on the one band and the output shaft on the other hand, an arrangement results which in a cross sectional view has the shape of a rectangular or a square. Thus, the room is also used optimally in this direction.

The method according to the present invention transmits power to the output shaft via at least one hydraulic motor of at least one hydrostatic drive line during a substantial change of velocity of the movable machine. During substantially constant velocities of the movable machine, the power to be transmitted by the power shift transmission to the output shaft is exclusively transmitted via one mechanical drive line. The power is split between the mechanical drive line and the at least one hydrostatic drive line only to initiate the power transmission via the mechanical drive line. Alternatively, the power is transmitted to the output shaft via two hydraulic motors of two hydrostatic drive lines during a substantial change of velocity of the movable machine.

The hydraulic motors and the clutches of the hydrostatic drive lines are only activated in case of substantial changes of velocity of the machine. The hydrostatic drive lines are only used for intermediate ranges. In case of constant driving and/or working speeds, 100% of the torque is transmitted via a mechanical drive line. This is true for a great range depending on the usable number of revolutions of the engine. The hydraulic motors and the clutches of the hydrostatic drive line are not working. The pump for the hydraulic medium of the two hydrostatic drive lines is driven by the engine, but the power dissipation is considerably low since the turning angle of the pump is adjusted to 0°.

It is essential that the two hydrostatic drive lines are not mechanically connected to each other, but that they are separately controllable and therefore also differently controllable. It is possible that the two hydraulic motors of the two hydrostatic drive lines are controlled with different turning angles, especially with a turning angle=0 at one of the two hydraulic motors. Since only one of the turning angles is adjusted to 0 and consequently the turning angle of the other hydraulic motor is not adjusted to 0, the hydraulic power is transmitted via the other hydrostatic drive line. Thus, high pressures inside the pump, as they occur in prior art gears during adjusting both turning angles to 0 simultaneously, are avoided.

When a mechanical drive line is coupled to a hydrostatic drive line via a gear unit, a synchronization is attained by controlling the turning angles of the hydraulic pump and the corresponding hydraulic motor. Only one part of the power is transmitted via the hydraulic motor and the corresponding drive line. Consequently, only this part of the power is afflicted with the comparatively worse power dissipation.

In times when no power is transmitted via the hydrostatic drive line referred to, on the one hand, the turning angle of the hydraulic pump is adjusted to 0, and on the other hand, the clutches between the hydraulic motor and the mechanical gear unit of the hydrostatic drive line are disengaged. This does not imply that other elements of the hydrostatic drive line are not used. The synchronizing device referred to and the following gear unit is used via the mechanical drive line.

To produce a constant number of revolutions in a mechanical drive line, the changes of the driving speed arc controlled via one or both hydrostatic drive lines. Both hydrostatic drive lines may be used at the same time and commonly, respectively, to accelerate the machine from stand still. Generally, when the desired velocity is attained, it is sufficient to use one of the two drive lines to pass an intermediate range of the transmission of torque.

It is therefore an object of the present invention to provide a power shift transmission having a great operating efficiency.

Another object of the present invention is to provide a power shift transmission having a high operating efficiency especially at low speeds.

Another object of the present invention is to provide a power shift transmission having a low number of components.

Other objects, features and advantages of the present invention will become apparent to one with skill in the art upon examination of the following drawings and detailed description. It is intended that all such additional objects, features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views. The drawings schematically represent an apparatus according to a preferred embodiment of the present invention, its measuring principles and illustrative data related to this embodiment.

FIG. 3 is a schematic diagram similar to FIG. 2 having only one mechanical drive line.

FIG. 4 is a basic sectional view along the axis of the drive lines and the output shaft.

DETAILED DESCRIPTION OF THE INVENTION

Figure 1:
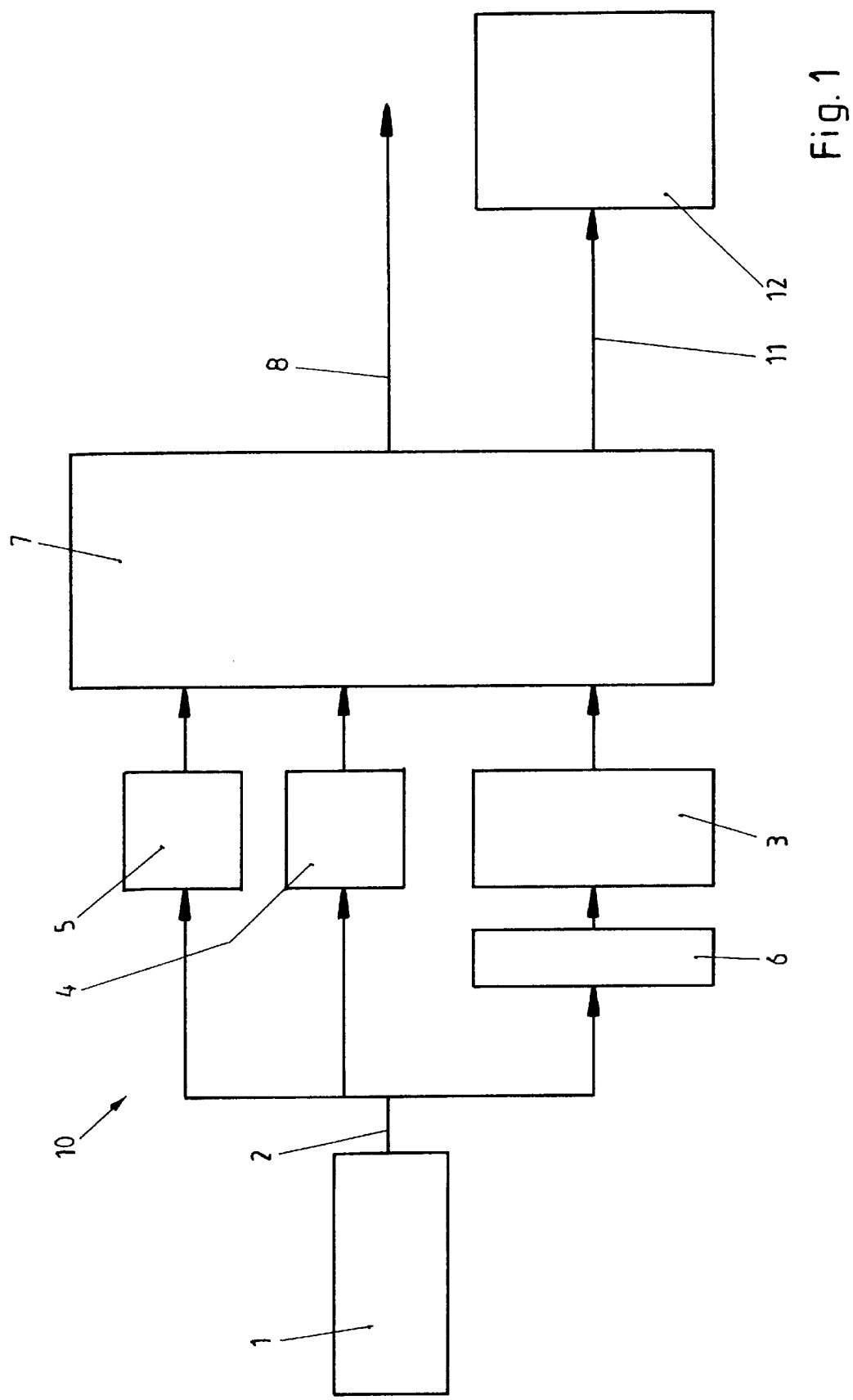
FIG. 1 is an schematic illustration of at least one mechanical drive line arranged in parallel to two hydrostatic drive lines.

Referring now in greater detail to the drawings, FIG. 1 symbolically illustrates an engine 1 including a shaft 2. The engine 1 provides the traveling and/or working drive for the movable machine or the vehicle. The drive comprises a mechanical direct drive 3 and two hydrostatic drive lines 4 and 5. An absorber 6 may be arranged preceding to the direct drive 3. The direct drive 3 and the two hydrostatic drive lines 4 and 5 are operatively arranged in parallel. They can be used alternatively or at the same time. A gear 7 having an output shaft 8 is arranged following to the drives 3, 4 and 5. Usually, the output shaft 8 is used to run the traveling drive.

The shaft 2 of the engine 1 forms an input shaft 9 of a power shift transmission 10 comprising the above mentioned components. Another gear 12 may be arranged following to a power takeoff shaft 11 of the gear 7 to generate different numbers of revolutions and/or to invert the direction of rotation.

Figure 2:
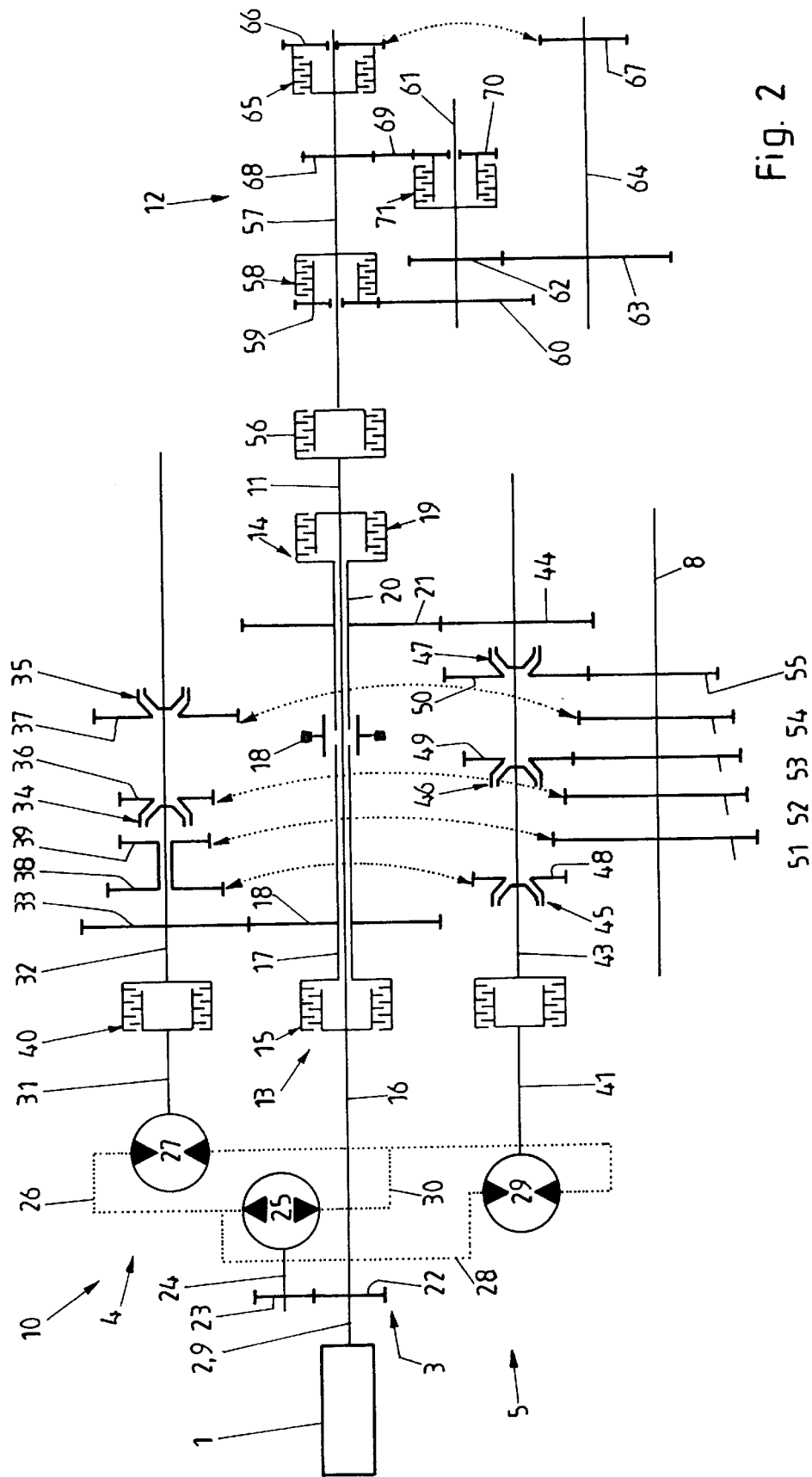
FIG. 2 is a schematic diagram of an arrangement of the elements of the drive line.

Referring now to FIG. 2, the power shift transmission 10 is provided with a continuous shaft beginning as input shaft 9 and ending as power takeoff shaft 11. The mechanical direct drive 3 is arranged in the axis of this shaft and comprises a first mechanical drive line 13 and a second mechanical drive line 14. The second mechanical drive line 14 is arranged axially following to the first mechanical drive line 13. The first mechanical drive line 13 has a clutch 15 one part of which is mechanically connected to the input shaft 9 and a continuous shaft 16 mechanically connected thereto, respectively. The other part of the clutch 15 is mechanically connected to a shaft 17 being arranged to rotate in a bearing. A gear 18 is mechanically connected to the shaft 17. The second mechanical drive line 14 is arranged similarly and includes a clutch 19, a shaft 20 and a gear 21.

The two hydrostatic drive lines 4 and 5 also can be driven via the shaft 2 of the engine 1. For this purpose, a gear 22 is arranged on the shaft 2, the gear 22 meshing with a gear 23 arranged on a pump shaft 24 of a hydraulic pump 25. A hydraulic conduit 26 leads from the hydraulic pump 25 to the hydraulic motor 27 being part of the hydrostatic drive line 4. Correspondingly, a hydraulic conduit 28 leads to a hydraulic motor 28 of the second hydrostatic drive line 5.

Additional to the hydraulic motor 27, the hydrostatic drive line 4 comprises a clutch 40, one part of which is mechanically connected to a motor shaft 31. The other part of the clutch 40 is mechanically connected to a shaft 32. A gear 33 is arranged on the shaft 33, the gear 33 engaging the gear 18. The parts of two synchronizing devices 34 and 35 are located on and mechanically connected to, respectively, the shaft 32 in the region of the hydrostatic drive line 4. The synchronizing device 34 carries a gear 36 and the synchronizing device 35 carries a gear 37. Further, a gear 38 and a gear 39 are provided on the shaft 32. The gears 38 and 39 are mechanically connected to each other but free to rotate on the shaft 32.

The arrangement of the hydrostatic drive line S is similar to the arrangement of the hydrostatic drive line 4. A motor shaft 41 connected to the hydraulic motor 29 carries one part of a clutch 42. The other part is located on a shaft 43 carrying a gear 44 engaging the gear 21 of the second mechanical drive line 14. Several synchronizing devices 45, 46 and 47 are provided on the shaft 43 and work with the respective elements of the shaft 32 of the mechanical drive line 4. Parts of the synchronizing devices 45, 46 and 47 are mechanically connected to the shaft 43. The other part of the synchronizing device 45 carries a gear 48 engaging the gear 38. This engagement is indicated by a dot line arrow in FIG. 2. The synchronizing device 46 comprises a gear 49 and the synchronizing device 47 carries a gear 50. The synchronizing devices 45, 46 and 47 are part of either the hydrostatic drive line 4 or S, so that in this embodiment the hydrostatic drive line 4 comprises two synchronizing devices 34 and 35, and the hydrostatic drive line 5 comprises three synchronizing devices. The number of synchronizing devices of the hydrostatic drive lines may also be just the other way around. The number of synchronizing devices may also be the same for the hydrostatic drive lines.

Five gears 51, 52, 53, 54 and 55 are mechanically connected to the output shaft 8. The gear 51 constantly engages the gear 39 of the hydrostatic drive line 4. The gear 52 meshes with the gear 36. The gear 54 engages the gear 37 of the hydrostatic drive line 4. The output shaft 8 is connected to the hydrostatic drive line 5 via the gear 53 meshing with the gear 49 of the synchronizing device 46. Correspondingly, the gear 55 is connected to the gear 50 of the synchronizing device 47.

The hydraulic pump 25 and the two hydraulic motors 27 and 29 are such of the axial piston type having a controllable turning angle. Each of the three turning angles is adjustable independent of the other turning angles. This changeable adjustment includes the position 0. The clutches 15, 19, 40, 42 are power shift clutches. The synchronizing devices 34, 35, 45, 46, 47 each comprise two synchronizing rings which can only be shifted power-free. Although the clutches as well as the synchronizing devices are designed to engage and disengage, the design of the synchronizing devices is much more simple than the design of the clutches.

For the connection to a gear 12, a clutch 56 may be provided at the end of the power take-off shaft 11 of the power shift transmission 10. The gear 12 comprises a first shaft 57 carrying one part of the clutch 58. The other part of the clutch 58 comprises a gear 59. The gear 59 engages a gear 60 of a shaft 61 further carrying a gear 62. The gear 62 engages the gear 63 located on a shaft 64. In this manner, a relatively slow drive, for example for a working tool, is provided. A clutch 65 with a gear 66 serves to provide a relatively high number of revolutions of the shaft 64. The gear 66 engages a gear 67 of the shaft 64. When the direction of rotation of the shaft 64 is to be changed, the torque is transmitted via a gear 68 on a shaft 57, a change wheel 69 and a gear 70 on a clutch 71. The other part of the clutch 71 is located on a shaft 61, so that a gear unit comprising the gears 62 and 63 can be used to drive the shaft 64 also when the direction of rotation is changed.

Since the embodiment shown in FIG. 3 is similar to the embodiment according to FIG. 2 to a great extend, it is referenced thereto. The embodiment of FIG. 3 does not include a second mechanical drive line 14. Also, the gear 12 is different. Since the details of the gear 12 are of no great importance to the invention, an explanation in addition to the self-explanatory drawing is not given. It is easy to understand that the mechanical direct drive 3 may also comprise the mechanical drive line 14 instead of the mechanical drive line 13.

Figures 5, 6:
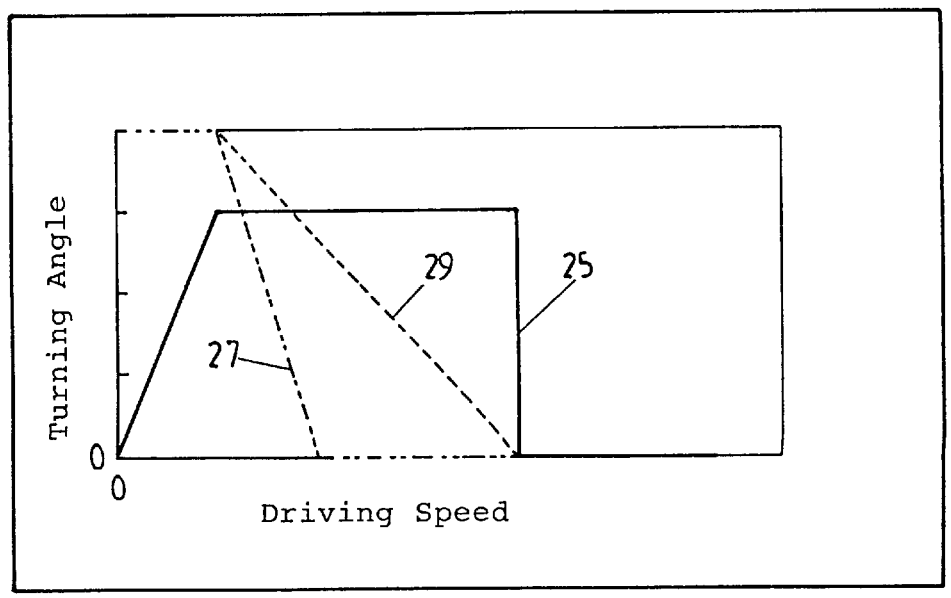
FIG. 5 is a table illustrating rising ranges of velocity for the embodiment of the power shift transmission according to FIG. 2.
FIG. 6 is a diagram of the tuning angles of the pump and the two hydraulic motors over driving speed of the vehicle.

The function of the power shift transmission 10 according to FIG. 2 is explained with reference to the table of FIG. 5.

The firm column shows different driving levels 1 to 15 as they may occur during drive off of a machine from stop up to maximum speed. The respective elements are shown in the other columns. If an element is used or active, respectively, this is indicated by an x, whereas a free space indicates that an element is not used or inactive, respectively.

Generally, the power provided by the engine 1 can be transmitted to the output shaft 8 either hydrostatic via one or both hydrostatic drive lines 4, 5 or via the mechanical direct drive 3, that means either via the mechanical drive line 13 or the mechanical drive line 14. Since the clutches 40, 42, 15, 19 are to be switched separately, a combined power transmission hydrostatic/mechanical to the output shaft 8 is possible. When the machine is stopped and after the engine 1 is started, the hydraulic pump 25 is driven by the input shaft 9 and the gear unit 22, 23, so that hydraulic medium is delivered to the hydraulic motors 27 and 29 of the two hydrostatic drive lines 4 and 5. As it can be seen in FIG. 5, both hydrostatic drive lines 4 and 5 are active. Also, the clutches 40 and 42 are engaged, whereas the clutches 15 and 19 are disengaged. Thus, power is exclusively transmitted via the two hydrostatic drive lines 4 and 5. Depending on the turning angle of the hydraulic motors 27 and 29, the power is split between the two drive lines 4 and 5. The part of the power transmitted via the hydrostatic drive line 4 is transmitted via the motor shaft 31, the engaged clutch 40, the shaft 32, the synchronizing device 34, the gear 36 and the gear 52 to the output shaft 8. The other part of the power is transmitted via the hydrostatic drive line 5. The clutch 42 connects the motor shaft 41 to the shaft 43. The active synchronizing device 45 effects transmission of power to the output shaft 8 via the gears 48, 38, 39 and 51. The number of revolutions of the engine 1 can be increased while the first driving level is passed. It is emphasized that the turning angles of the hydraulic motors 27 and 29 are independently adjustable. According to driving level 2, the clutch 40 is disengaged and inactivated during a high enough or maximum number of revolutions of the engine 1.

At the same time, the turning angle of the hydraulic motor 27 is adjusted to zero. Since the synchronizing device 45 remains inactive and the power is transmitted via the above described elements, the synchronizing device 34 becomes power-free and can be opened and disengaged, respectively, so that the entire power is transmitted via the hydrostatic driving branch 5 to the output shaft 8. Thus, the turning angle of the hydraulic motor 29 is changed in a way to increase the driving speed of the output shaft 8. The clutch 19 of the mechanical drive line 14 is activated and engaged, respectively, and the clutch 42 of the hydrostatic drive line 5 is opened during a predetermined number of revolutions of the hydraulic motor 29. The hydraulic motor 29 and the hydraulic pump 25 are adjusted to a turning angle 0 at the same time. During this third driving level, the power is exclusively transmitted via the mechanical drive line using its advantageously high operating efficiency. No power dissipation occurs within the hydrostatic drive lines 4 and 5. In this case, the synchronizing device 45 generally being a part the hydrostatic drive line 5 is used to transmit the power within the mechanical drive line 14. This use is possible since the synchronizing device 45 has been active before the driving level 2.

In preparation for the driving level 4, the synchronizing device 34 within the hydrostatic drive line 4 the can be turned on without difficulty. This is done power-free and initially does not have an effect. As soon as the clutch 40 is then engaged, the driving level 4 is reached, and a part of the power is transmitted via the hydrostatic drive line 4. To attain the driving level 5, the clutch 19 is disengaged, so that now the entire power is transmitted via the hydrostatic drive line 4 and the synchronizing device 34. In the driving level 6 the other mechanical drive line 13 is active. The clutch 15 is engaged and the synchronizing device 34 remains engaged. Thus, the power is transmitted to the output shaft 8 via the gears 18, 33, the synchronizing device 34 and the gears 36, 52.

Referring to the above description, it is easy to understand how the remaining driving levels up to the maximum speed within the driving level 15 are working. It can be seen in FIG. 5 that the transmission of power in the driving levels 3, 6, 9, 12 and 15 is exclusively mechanical. The control works in a way that these driving levels are used in great ranges, whereas the other driving levels are only transit levels in small ranges. This embodiment of the power shift transmission 10 makes it possible to activate one synchronizing device power-free in each case to transmit the power via this active synchronizing device in the following driving level by activating a clutch.

With reference to the foregoing description, the relation between the driving speed and the turning angles of the hydraulic pump 25 and the hydraulic motors 27 and 29 can be clearly seen. It is also understood that the turning angles of the two hydraulic motors 27 and 29 are adjusted independently and in a different way with respect to time to pass the driving levels one after another.

Many variations and modifications may be made to the preferred embodiments of the invention without departing substantially from the spirit and principles of the invention. All such modifications and variations are intended to be included herein within the scope of the present invention, as defined by the following claims.

I claim:

1. A power shift transmission for a movable machine, said power shift transmission comprising:
    an input shaft driven by an engine;
    an output shaft;
    at least one mechanical drive line;
    at least two parallel separate hydrostatic drive lines, each of said separate hydrostatic drive lines including a separate shaft and being designed to be coupled to said output shaft via synchronizing devices and gear units;
    at least one power shift clutch arranged at the input end of said at least one mechanical drive line; and
    at least one power shift clutch arranged at the input end of each of said at least two separate hydrostatic drive lines.

2. The power shift transmission of claim 1, wherein said at least one mechanical drive line is designed to be coupled to said output shaft via at least one of said synchronizing devices and said gear units.

3. The power shift transmission of claim 1, wherein each of said hydrostatic drive lines is designed to be coupled to said output shaft via a plurality of said synchronizing devices and said gear units.

4. The power shift transmission of claim 1, wherein each mechanical drive line includes only one gear forming a gear unit with a gear mechanically connected to said shaft of one of said hydrostatic drive lines.

5. The power shift transmission of claim 1, comprising two alternatively working mechanical drive lines, each of said mechanical drive lines being arranged parallel to said at least two hydrostatic drive lines and each including a power shift clutch arranged at its input end.

6. The power shift transmission of claim 5, wherein each of said mechanical drive lines is designed to be coupled to said output shaft via at least one of said synchronizing devices and said gear units.

7. A power shift transmission for a movable machine, said power shift on comprising:
- an input shaft arranged at the input end of said power shift transmission and driven by an engine;
- an output shaft arranged at the output end of said power shift transmission;
- a first mechanical drive line arranged between the input end and the output end of said power shift transmission;
- a second mechanical drive line arranged between the input end and the output end of said power shift transmission; said first and second mechanical drive lines being arranged in line;
- a first separate hydrostatic drive line comprising a separate shaft and a first hydraulic motor and being designed to be coupled to said output shaft via synchronizing devices and gear units;
- a second separate hydrostatic drive line comprising a separate shaft and a second hydraulic motor and being designed to be coupled to said output shaft via synchronizing devices and gear units; wherein said first and second hydrostatic drive lines are arranged in parallel;
- a hydraulic pump being connected said first and second hydraulic motors by hydraulic conduits and supplying said first and second hydraulic motor with hydraulic medium;
- a first power shift clutch arranged at the input end of said first mechanical drive line; and
- a second power shift clutch arranged at the input end of said second mechanical drive line.

8. A method of controlling a power shift transmission for a movable machine, said method comprising the steps of:
- transmitting power to an output shaft via two hydraulic motors of two hydrostatic drive lines during a substantial change of velocity of the movable machine; and
- exclusively transmitting the power to be transmitted by the power shift transmission to the output shaft via one mechanical drive line during substantially constant velocities of the movable machine;
- wherein the power is split between the mechanical drive line and the two hydrostatic drive lines only to initiate the power transmission via the mechanical drive line.

9. The method of claim 8, wherein the power is transmitted to the output shaft via two hydraulic motors of two hydrostatic drive lines during a substantial change of velocity of the movable machine.

10. The method of claim 8, wherein the changes of velocity are controlled via at least one hydrostatic drive line to attain a constant number of revolutions in one mechanical driving line.

11. The method of claim 8, wherein the two hydraulic motors of the two hydrostatic drive lines are controlled with different turning angles.

12. The method of claim 11, wherein one of the turning angles of the two hydraulic motors is zero.

13. The method of claim 11, wherein a synchronization is attained by controlling the turning angle of one hydraulic pump and a respective one of the hydraulic motors during coupling one mechanical drive line to one hydrostatic drive line via a gear unit.

14. The method of claim 13, wherein the turning angle of the hydraulic pump is adjusted to zero and a clutch operatively arranged between the hydraulic motor and the gear unit is disengaged when no power is transmitted via a respective one of the hydrostatic drive lines.

* * * * *